Sept. 10, 1935.　　　　　M. L. FOX　　　　　2,013,880
SHOCK ABSORBER
Filed April 28, 1930　　　3 Sheets-Sheet 1
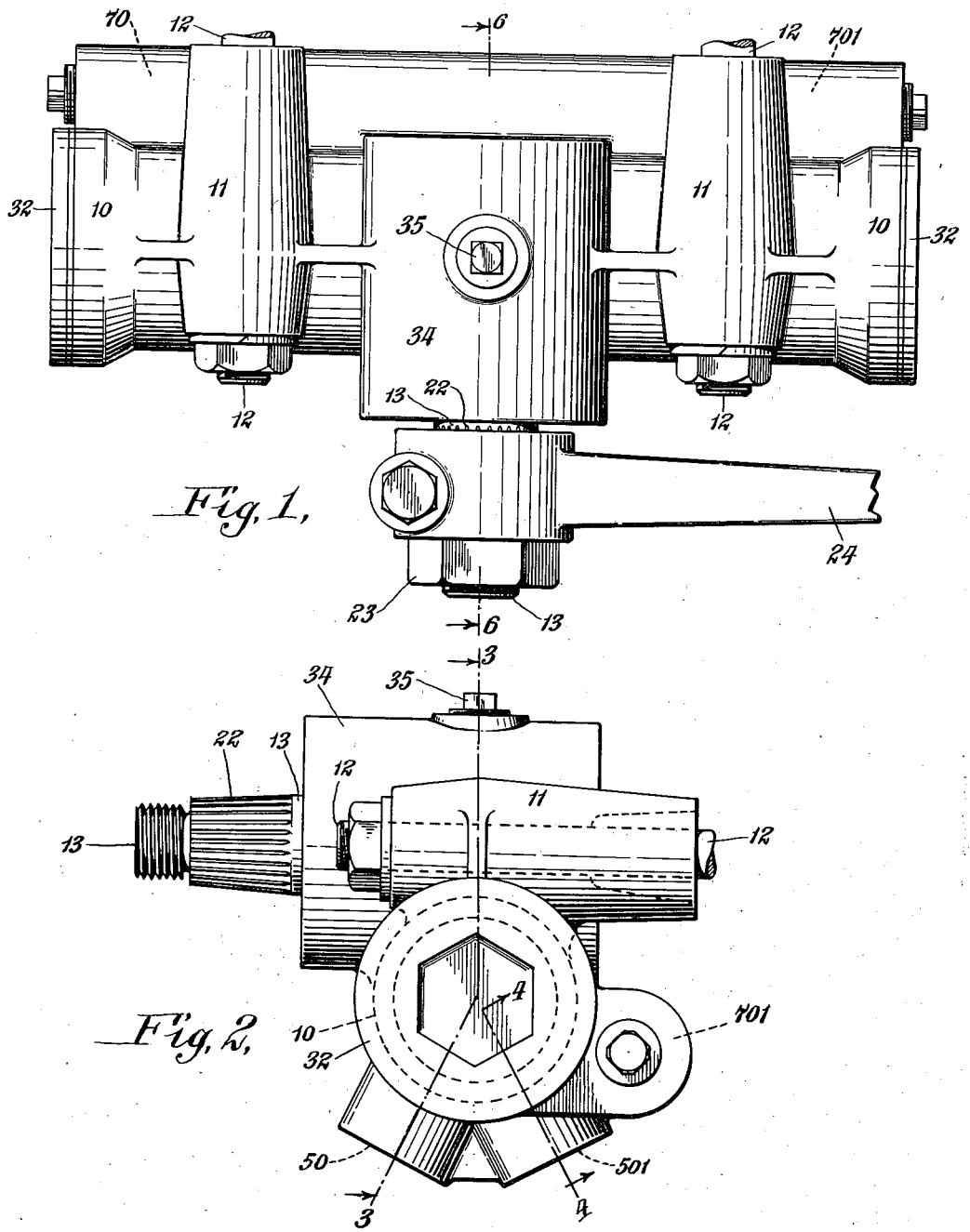

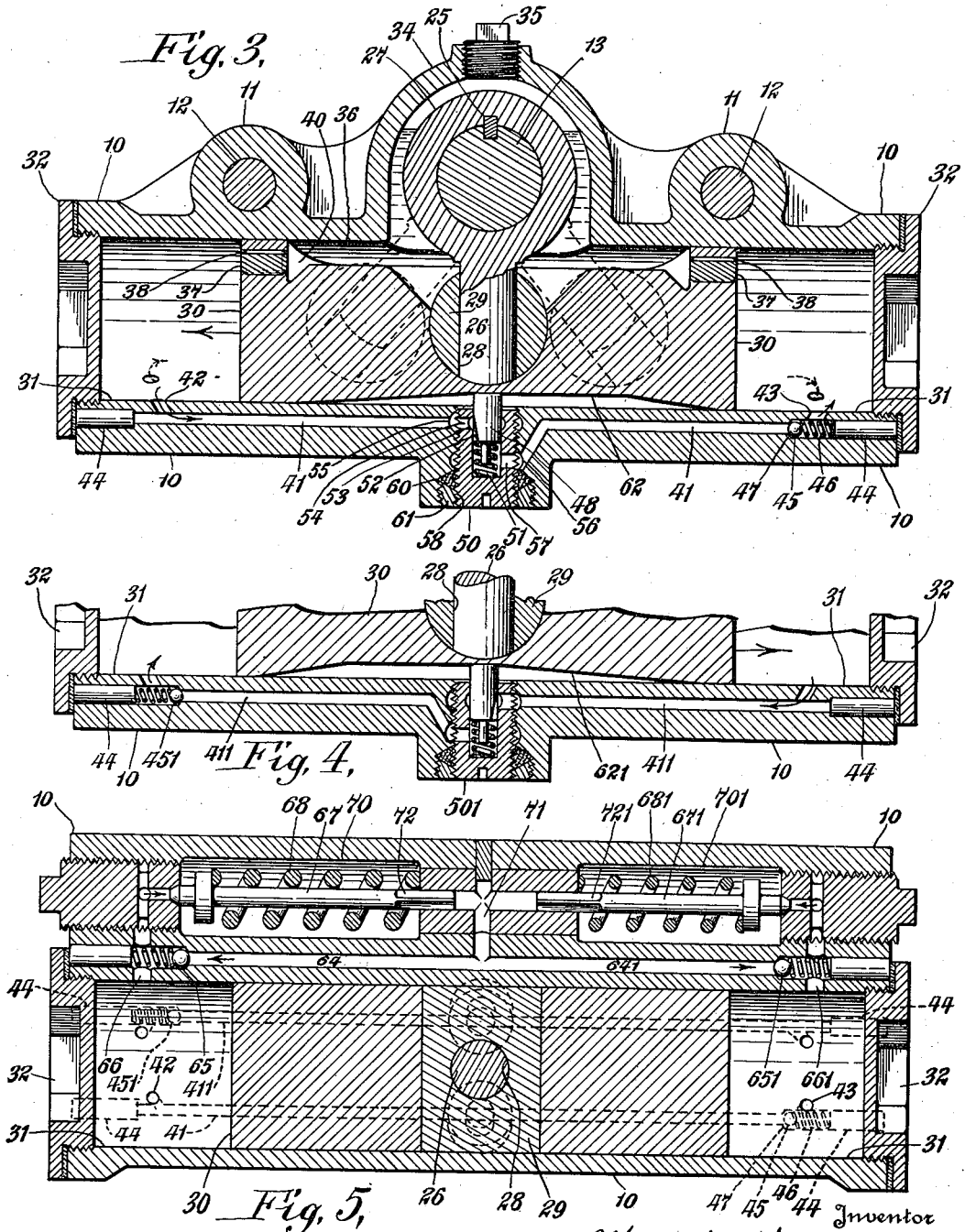

Sept. 10, 1935.  M. L. FOX  2,013,880
SHOCK ABSORBER
Filed April 28, 1930   3 Sheets-Sheet 3

Merritt L. Fox, Inventor
By Popp & Powers
Attorneys

Patented Sept. 10, 1935

2,013,880

UNITED STATES PATENT OFFICE 2,013,880

SHOCK ABSORBER

Merritt L. Fox, Buffalo, N. Y., assignor to Houde Engineering Corporation, Buffalo, N. Y., a corporation of New York Application April 28, 1930, Serial No. 447,969

11 Claims. (Cl. 188—88)

This invention relates to a shock absorber for equalizing or absorbing the disagreeable and superfluous unbalanced forces which are imposed by and upon the spring suspension and running gear of an automobile or other spring supported vehicle when traveling over an uneven road surface. In particular the invention relates to a shock absorber having a reciprocatory piston and utilizing a liquid as the resistance medium.

One of the objects of the invention is to absorb all of such superfluous forces during both the up and the down movements of the running gear relatively to the body of the vehicle, and to absorb these forces to an extent exactly equivalent to the quantity of superfluous force existing at all positions of the relatively moving members, irrespective of whether or not this quantity of force varies uniformly with the position of said relatively moving members.

Another object of the invention is to provide a shock absorber which permits of a substantially free or unhampered spring-suspension movement when only minor movements thereof occur, and also provides for the absorption of heavy imposed forces when extreme flexures of the spring suspension occur.

A further object of the invention is to prevent the occurrence of either vacuums or of excess pressures in the shock absorber.

Still further objects of the invention are disclosed in detail in the following description wherein:—

In the accompanying drawings:

Figure 1 is a top plan of the shock absorber with the outer end of the rock arm broken away.

Figure 2 is a right hand, end elevation of the same with the rock arm entirely removed.

Figure 3 is an approximately vertical, longitudinal section through the shock absorber taken on line 3—3, Figs. 2 and 6.

Figure 4 is a similar but fragmentary section taken on line 4—4, Figs. 2 and 6.

Figure 5 is an approximately horizontal section of the shock absorber taken on line 5—5, Fig. 6.

In the following description, similar characters of reference indicate like parts in the several views of the drawings.

Figure 6:
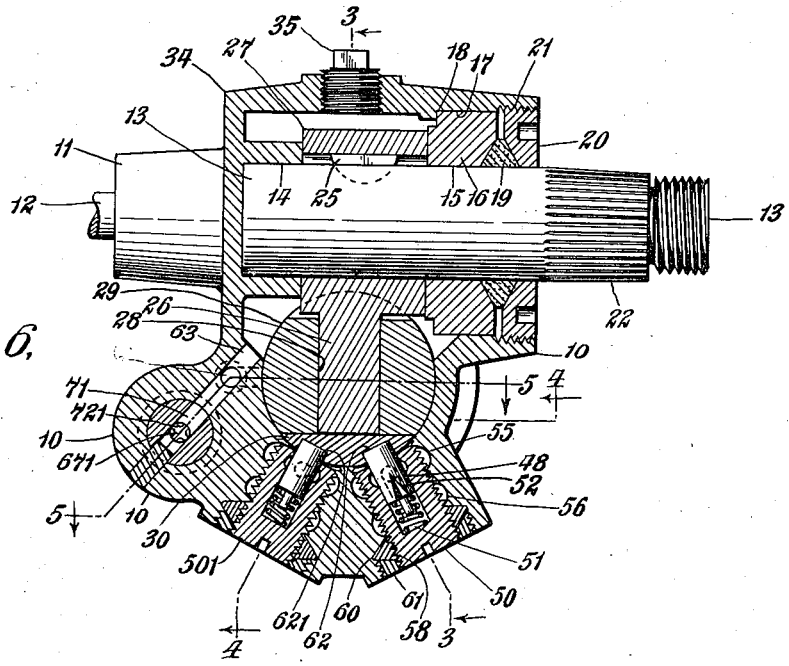
Figure 6 is a vertical transverse section of the shock absorber taken on line 6—6, Fig. 1.

My invention may be embodied in various forms and in shock absorbers of different constructions, and the present construction is therefore to be regarded merely as one specific organization which satisfactorily carries out the invention in practice.

This improved shock absorber comprises a main housing, body or casing 10 which is provided on its upper face, at opposite ends thereof, with a pair of transverse supporting heads 11 which are preferably integral with said main casing 10 and are transversely bored to receive suitable clamping bolts 12 whereby said casing is adapted to be bolted to the main frame or body of the automobile or other vehicle which is provided with a spring suspension.

Journaled horizontally and transversely in the upper central part of said casing 10 is a rock shaft 13, the same being journaled at its rear end in a suitable rear bearing 14 (formed in said casing 10) and journaled at its front end in the front bearing 15 of a bearing block 16 whose periphery is press fitted within the bore 17 of said casing against a suitable shoulder 18. Fluid leakage through said front bearing 15 is prevented by the provision of a soft gland or packing ring 19 which may be adjustably compressed any desired amount by a suitable packing collar 20. The periphery of the latter is provided with a suitable external screw thread 21 which meshes with a corresponding internal screw thread formed in the main casing 10.

The outboard end of said rock shaft 13 is provided with tapered splines 22 and a clamp nut 23 or is otherwise adapted to be secured to the hub of a rock arm 24. The outer end of said arm is adapted to be operatively connected, in the usual and well known manner, by means of a drag link or otherwise, with the vehicle axle or other member whose movements are to be controlled relatively to the vehicle body or other body which is to be shielded from shocks.

Secured by a woodruff key 25 or otherwise to the rock shaft 13 is a thrust arm 26, the hub 27 of which bears at its opposite ends against the inner ends of the rear bearing 14 and the bearing block 16. The downwardly projecting portion of said thrust arm 26 is cylindrical and is slidably arranged within a cylindrically shaped diametral slot 28 which is formed transversely and diametrically through the central part of a cylindrical shaped pivot head, wrist pin or gudgeon 29. The latter is disposed horizontally and transversely of the main frame 10 of the shock absorber and has its outer annular ends rotatably mounted in the central part of a double headed displacement plunger or piston 30. By this construction, a given angular movement of the thrust arm 26 produces a relatively greater longitudinal movement of said piston when the latter is near either end of its stroke than occurs when said piston is near the middle of its stroke.

Said piston 30 is annularly formed at its opposite ends to provide a substantially fluid tight joint with the cylindrical walls of a fluid working chamber 31 in which latter said piston 30 is adapted to move back and forth in unison with the movement of the rock arm 24 and the vehicle axle. The ends of said cylinder are suitably capped by a pair of cylinder heads 32, 32, which are secured to said cylindrical working chamber 31 by means of screw threads 33 or otherwise.

Extending above the central upper part of the working chamber 31 is a replenishing chamber or reservoir 34 which is preferably formed integral with the main casing 10 and has its wall formed symmetrically with the rock shaft 13 and is supplied with a suitable resistance fluid through a screw plug 35. The lower part of said reservoir 34 opens downwardly into the upper central part of the working chamber 31 and communicates at all times with a longitudinal fluid trough 36 which is formed in the central upper peripheral face of the piston 30 but which stops short of the opposite ends thereof. Adjacent the opposite termini of said trough the piston 30 is longitudinally and eccentrically bored at opposite ends to receive a pair of air vent plugs 37 each of which is provided on its upper periphery with a vent groove 38. The function of these vent grooves 38 is to allow entrained air bubbles to flow out of the opposite ends of the working cylinder 31 and to pass up into the upper part of said replenishing reservoir 34. Just inside the inner end of said vent plugs 37, the piston 30 is provided with a pair of sediment sumps or pockets 40 which open upwardly and inwardly into the aforesaid fluid trough 36. The purpose of these sediment pockets is to collect solid sediment in the resistance fluid and keep the same out of circulation in the manner shown and claimed in the patent application of Ralph Peo, Serial No. 434,523.

In the particular disclosure shown in the drawings, the construction is assumed to be such that when the piston 30 moves to the left end of the working chamber 31 as in Fig. 3, it creates a relatively high pressure in this left or "high pressure" end of said chamber, corresponding to the downward movement of the vehicle axle relatively to the body of said vehicle, whereas, when said piston moves to the right end of said working cylinder as in Fig. 4, it creates a relatively low pressure in the right or "low pressure" end of said chamber corresponding to the rise of the vehicle axle relatively to the vehicle body.

Formed longitudinally in the front lower wall of the main casing 10 is a high pressure transfer passage 41 whose opposite ends open into the bore of the working cylinder 31 at opposite ends thereof at intake opening 42 and exhaust opening 43 respectively. The extreme outer ends of said transfer passage are suitably sealed up by sealing plugs 44 which are employed merely because of the exigencies of construction, a cored hole in this case being obviously impractical. A flow of resistance fluid in the one direction only through said high pressure transfer passage 41 is ensured by the provision of a suitable check valve 45 adjacent the exhaust opening 43. Said check valve comprises a sphere or check valve ball and a compression spring 46 which resiliently presses said check valve ball against a conical check valve seat 47 formed suitably in the bore of the transfer passage 41. The opposite end of said compression spring 46 bears against the inner end of the adjacent sealing plug 44.

The central portion of said high pressure passage 41 is provided with a high pressure, cylindrically shaped, graduating valve 48 whose axis is radial with respect to the main casing 10 and is slidably arranged within the bore of an adjustment sleeve 50. Said graduating valve is resiliently pressed inwardly by a compression spring 51 the outer end of which bears against the lower closed end of the sleeve 50. The one lateral lower side of said graduating valve 48 is provided with a straight, inclined, bevelled face 52 so that, as said valve moves up or down, said bevelled face more or less uncovers an annular groove or port 53 which is formed in the upper bore of the adjustment sleeve 50. Said annular port 53 is in communication with the left or high pressure end of the pressure passage 41 through a duct 54 which opens radially outward from said annular port and extends through the wall of said adjustment sleeve 50 into an annular inlet groove 55 formed in the main casing adjacent the periphery of the sleeve 50. Said annular groove 55 communicates directly with the left or high pressure end of the transfer passage 41. The right or low pressure end of said transfer passage 41 communicates with a similar outlet annular groove 56 which communicates with the bore of the sleeve 50 through an outlet duct 57.

The adjustment sleeve 50 is longitudinally adjustable relatively to the main casing 10 and hence also to the graduating valve 48, being provided on its periphery with external screw threads 58. Fluid leakage between said adjustment sleeve and the casing 10 is prevented by the provision of a soft packing ring 60 which is suitably compressed by an externally threaded packing collar 61. The fact that the rotary position of neither said adjustment sleeve 50 nor the graduating valve 48 is fixed is the reason for the use of the annular port 53 and the inlet and outlet grooves 55 and 56 respectively.

The upper end of the graduating valve 48 is square faced and bears radially inward against the bottom of a high pressure cam groove 62 which is formed longitudinally in the lower front peripheral face of the piston 30. As said piston moves back and forth, said graduating valve 48 is more or less depressed against the resistance of its spring 51 and thereby more or less cuts off the flow of resistance fluid from the high pressure end of the working chamber 31 to the low pressure end of said chamber.

In the full line position of the piston 30 shown in Fig. 3, it is assumed that the body of the vehicle is fully loaded but motionless or static. If from this position the vehicle axle is moved slightly downwards, the position of the graduating valve 48 is not affected inasmuch as the high pressure groove 62 is longitudinally flat for some distance to the right of said valve 48 as seen in Fig. 3. This is the action of the shock absorber corresponding to the movement of the vehicle over relatively small ripples or obstructions in the pavement. Further on to the right, the extreme right end of said groove 62 tapers off to zero, and this corresponds to the proper shock absorber action which should and in the present invention does take place when the adjacent vehicle wheel drops into a relatively deep hole in which case the resistance is gradually increased to a maximum as the vehicle axle moves to its extreme lower position relatively to the body of the vehicle. Thus the downward movement of the vehicle axle is gradually checked by this gradually increased closing of the high pressure valve 48 as the piston 30 moves toward its extreme left position. This softening action eliminates the need of the rebound clips which are usually at the present time employed on automobile springs.

If from the static position, the vehicle axle is moved to its extreme upward position and then is rendered free to move downward under the influence of the vehicle spring, the piston 30 is moved from its extreme right position towards the left, the direction of movement being as in Fig. 3. At the start of this movement, the graduating valve 48 is depressed to a maximum extent and this causes a maximum resistance to downward movement of the vehicle axle corresponding to the maximum force which is at this time stored in the vehicle springs. As the vehicle axle continues to move downwardly, this stored-up spring pressure decreases and for this reason the slope of the left end of said high pressure cam groove 62 tapers upwardly and to the right so as to gradually and correspondingly reduce the fluid back pressure through the graduating valve 48, as the piston moves to the left from its extreme right position. It should be noticed that this cam groove 62 only controls the fluid resistance of the shock absorber on the downward movements of the vehicle axle and that this groove may be constructed exactly in accordance with the requirements for such downward movements irrespective of what the peculiar requirements may be for the upward movements of said vehicle axle. It should also be noted that the shape of said high pressure groove 62 determines the proportion of fluid flow through the transfer passage 41 for various positions of the piston 30, whereas the adjustable inward or outward movement of the adjustment sleeve 50 determines solely the quantity of fluid which is allowed to pass through said transfer passage. It should also be noted that after the adjustment of said sleeve 50 is effected, the packing collar 61 is useful as a lock nut to hold said sleeve in position, as well as being also useful as a packing collar for the soft packing ring 60. When the piston 30 moves toward the right, all fluid flow through the high pressure transfer passage 41 is prevented by the ball check valve 45 aforementioned.

The movement of the piston 30 to the right (i. e., toward the low pressure end of the working chamber 31 as in Fig. 4) is controlled by the opposition of resistance fluid flowing through the transfer passage 411 in a manner quite similar to the manner of controlling leftward movements of said piston as in Fig. 3, except that the flow of fluid in this case is in the reverse direction and the shape of the low pressure cam groove 621 is different from that of cam groove 62. The check valve 451 ensures that fluid only passes to the left through the low pressure transfer passage 411. If desired, these cam grooves 62 and 621 may be absolutely identical in whole or in part but it is to be noted that the construction of Figs. 1–6 permits of independent differences in the bottom shape of said cam grooves and therefore the characteristics of the fluid flow may be made different from each other relatively to both the position and the direction of movement of said piston.

Referring to Fig. 6, it will be seen that the reservoir 34 communicates through a lateral fluid duct 63 into a pair of high and low pressure balancing ducts 64 and 641 (see Fig. 5) which extend lengthwise through the lower rear wall of the main casing 10 on either longitudinal side of said lateral duct 63. Fluid flow from the high pressure balancing duct 64 is permitted by a ball check valve 65 to only flow toward the left into a high pressure unloading duct 66, and thence into the left or high pressure end of the working chamber 31. A symmetrically arranged check valve 651 is arranged at the other end of the shock absorber casing to permit fluid flow from the low pressure balancing duct 641 to only flow toward the right into a low pressure unloading duct 661 and thence into the low pressure or right end of the working chamber 31.

Arranged in the main casing adjacent the balancing ducts 64 and 641 is a high pressure unloading valve 67 and a low pressure unloading valve 671, the former being provided with a stiff spring 68 and the latter with a light spring 681. Said valves are disposed within high and low pressure unloading valve chambers 70 and 701 respectively, the inner ends of which communicate with the lateral fluid duct 63 through a lateral extension duct 71. The inner ends of the valve stems of the unloading valves 67 and 671 are suitably milled longitudinally or otherwise scored at 72 and 721 to permit the aforesaid fluid flow from the unloading valve chambers 70 and 701 past the stems of said valves and into the aforesaid lateral extension duct 71.

When the piston 30 moves in either direction at such a speed that an excessive pressure is built up in one or the other end of the working chamber 31, one or the other of these unloading valves opens and vents the excessive pressure into the reservoir 34. For instance, an excessive pressure in the left end of said working chamber 31 forces the fluid out through the high pressure unloading duct 66; unseats the high pressure unloading valve 67 against the pressure of its heavy spring 68; causes the fluid under its excess pressure to pass out through the high pressure valve chamber 70; past the milled portions 72 of the stem of said high pressure unloading valve; into the extension duct 71 and into the lateral fluid duct 63; and thence into the reservoir 34.

If, instead of an excessively high pressure, we have an excessively low pressure or partial vacuum formed in either end of the working chamber 31, then another action occurs. In this case one or other of the ball check valves 65 or 651 is caused to open up by reason of the partial vacuum and this action allows fluid from the reservoir 34 to pass into the end of the particular cylinder in which the partial vacuum or excessively low pressure exists. For instance, if a partial vacuum is present in the left or high pressure end of the working chamber 31, this negative pressure is carried to the high pressure unloading duct 66 where it opens the high pressure check valve 65 and causes a flow of fluid through the high pressure balancing duct 64 from the lateral fluid duct 63 and from the fluid reservoir 34. When a partial vacuum occurs in the right end of said working cylinder 31, the check valve 651 opens in a corresponding manner and allows fluid to flow into the right end of said working cylinder until the undesirable partial vacuum condition has been corrected whereupon said check valve closes under the influence of its spring. It should be noted that an excessively high pressure can be vented from either end of the working cylinder 31 and simultaneously the partial vacuum in the opposite end of said working cylinder eliminated. The action of the unloading valves 67 and 671 and of the ball check valves 65 and 651 is constant as regards their effect on fluid flow. For this reason all variations of fluid flow as to proportions are controlled solely by the shape of the cam grooves 62 and 621 whereas the variations in quantity of said fluid flow are controlled by the position of the adjustment sleeves 50 and 501.

Figure 7:
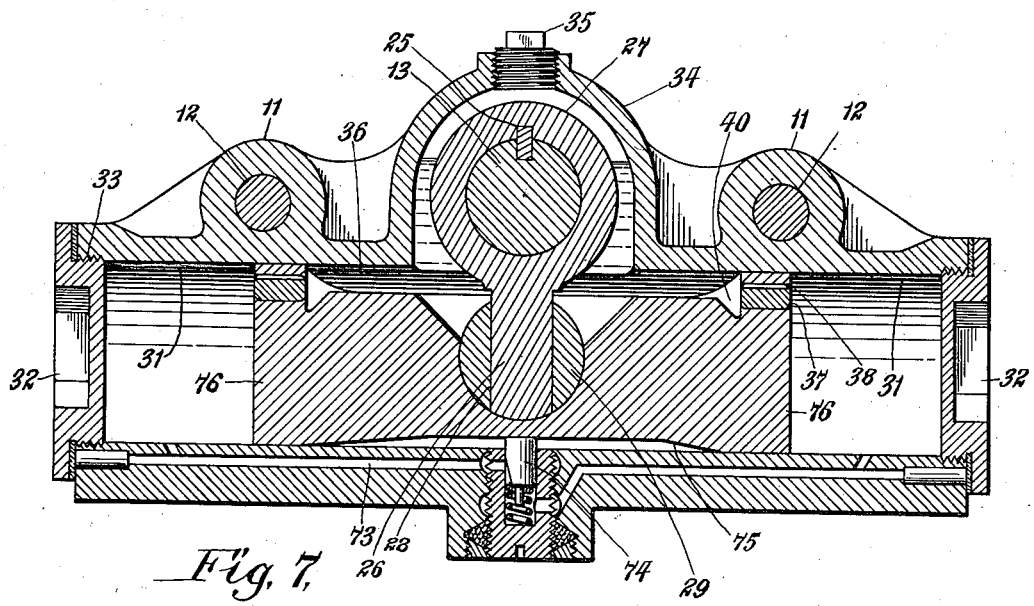
Figure 7 is a vertical longitudinal section of a modified form of the invention.

In Fig. 7 is shown a more simple and less expensive modified form of the invention. In this case only one transfer passage 73 and one graduating valve 74 are employed. In this case as in the preferred construction of Figs. 1–6, the cam groove 75 may be formed variably as conditions may warrant and said cam groove therefore does not have to be symmetrical. It is obvious, however, that the position of the graduating valve 74 is in this case a direct function of the position of the piston 76 and that this is true irrespective of the direction of movement of said piston 76.

It is clear from the construction of the improved shock absorber shown herein that when properly adjusted, it is capable of "absorbing" shocks in a more effective manner and more completely than in the case of any other present day shock absorber.

I claim:

1. A shock absorber comprising a working chamber adapted to contain a fluid; a piston movably arranged therein; a transfer passage leading from one end of said chamber; a graduating valve actuated by said piston and controlling the proportions of fluid passing through said passage; and means for regulating the quantity of flow through said passage.

2. A shock absorber comprising a chamber adapted to contain a fluid; a piston movably arranged therein; a pair of transfer passages connected at opposite ends to the opposite ends of said chamber; a check valve in each of said passages to ensure opposite fluid flows therethrough; and a graduating valve operatively connected with said piston and adapted to control the flow of fluid through one of said passages.

3. A shock absorber comprising a chamber adapted to contain a fluid; a piston movably arranged therein; a pair of transfer passages connected at opposite ends to the opposite ends of said chamber; a check valve in each of said passages to ensure opposite fluid flows therethrough and graduating valves operatively but dissimilarly actuated by said piston and adapted to control the flow of fluid through their companion passages.

4. A shock absorber comprising a chamber adapted to contain a fluid; a piston movably arranged therein; a pair of transfer passages connected at opposite ends to the opposite ends of said chamber; a check valve in each of said passages to ensure opposite fluid flows therethrough and graduating valves operatively but individually actuated by said piston; each of said valves being adapted to individually control the flow of fluid through its companion transfer passage.

5. A shock absorber comprising a chamber adapted to contain a fluid; a piston movably arranged therein; a pair of transfer passages connected at opposite ends to the opposite ends of said chamber; a check valve in each of said passages to ensure opposite fluid flows therethrough and a pair of graduating valves so actuated individually by said piston as to cause alternate and opposite flows of liquid through their companion transfer passages; the characteristics of each of said flows being different from the other as to both the relative position and the relative direction of movement of said piston.

6. A shock absorber comprising a working chamber adapted to contain fluid, a piston movably arranged in said chamber, a bypassageway connecting the opposite ends of said working chamber, and a valve interposed in said bypassageway, said piston having a cam surface cooperating with said valve to cause movement thereof for corresponding adjustment of said bypassage during movement of said piston in said chamber.

7. A shock absorber comprising a housing providing a working chamber adapted to contain a fluid, a piston reciprocable within said chamber to displace the fluid therein, a bypassageway through said housing for flow of fluid from one side of the piston to the other, a controlling valve for said bypassageway, and a cam surface formed on said piston to engage with and actuate said valve for control of the fluid flow through said passageway in proportion to the load to which the piston is subjected.

8. A shock absorber comprising a housing providing a working chamber adapted to contain a fluid, a piston adapted to reciprocate within said chamber to displace the fluid therein, a bypassageway through said housing for flow of fluid from one side of the piston to the other, a valve seat on said housing interposed in said bypassageway, a valve movable relative to said seat, and a cam surface on said piston formed to engage with and move said valve during reciprocation of the piston to automatically adjust said valve for flow of fluid through said bypassageway in proportion to the load to which the piston is subjected, said valve seat being adjustable.

9. In a shock absorber a casing providing a working chamber, an oscillatory piston dividing the chamber in a pair of pressure compartments, a fluid transfer connection providing communication between said compartments, a spring seated pressure regulating valve for controlling flow through said connection and a piston cammed valve for varying the effective area of a portion of said connection as the piston oscillates.

10. In a shock absorber a casing providing a working chamber, an oscillatory piston dividing the chamber into a pair of pressure compartments, a fluid transfer connection providing communication between said compartments, said connection including a metering port, a spring seated pressure regulating valve controlling flow through the connection after a passage of fluid through the metering port, and means for varying cross-sectional area of the metering port as the piston oscillates, said means comprising a plunger and coacting cam surfaces on the plunger and the piston.

11. A shock absorber comprising a working chamber adapted to contain a fluid, a piston movable in said chamber to displace the fluid therein, a transfer passage for the flow of the displaced fluid, and a valve for said passage located in the path of said piston to be moved thereby to control the flow through said passage.

MERRITT L. FOX.